US009443260B2

(12) United States Patent
Chan et al.

(10) Patent No.: US 9,443,260 B2
(45) Date of Patent: Sep. 13, 2016

(54) SYSTEM, METHOD, AND COMPUTER PROGRAM PRODUCT FOR CATALOG ADAPTATION

(75) Inventors: Victor Chan, Thornhill (CA); Ross McKegney, Toronto (CA); Jeffrey A. Shiner, Richmond Hill (CA); Ramiah K. Tin, Pickering (CA); Jian Zhang, North York (CA)

(73) Assignee: International Business Machines Corporation, Armonk, NY (US)

( * ) Notice: Subject to any disclaimer, the term of this patent is extended or adjusted under 35 U.S.C. 154(b) by 3114 days.

(21) Appl. No.: 11/614,179

(22) Filed: Dec. 21, 2006

(65) Prior Publication Data
US 2008/0154745 A1 Jun. 26, 2008

(51) Int. Cl.
G06Q 30/00 (2012.01)
G06Q 30/06 (2012.01)

(52) U.S. Cl.
CPC ...... *G06Q 30/0603* (2013.01); *G06Q 30/0623* (2013.01); *G06Q 30/0641* (2013.01)

(58) Field of Classification Search
CPC .......................................... G06Q 30/00–30/08
USPC ............................................... 705/26.1–27.2
See application file for complete search history.

(56) References Cited

U.S. PATENT DOCUMENTS

| 7,797,271 B1* | 9/2010 | Bonneau et al. ............. 705/27 |
| 2003/0083959 A1 | 5/2003 | Song et al. |
| 2004/0205585 A1* | 10/2004 | McConnell .................. 715/513 |
| 2006/0167760 A1* | 7/2006 | Chakraborty et al. ......... 705/26 |
| 2008/0114803 A1* | 5/2008 | Chinchwadkar et al. .... 707/102 |

OTHER PUBLICATIONS

A Web Service Based Framework for the Semantic Mapping Amongst Product Classification Schemas Beneventano, Domenico; Guerra, Francesco; Magnani, Stefania; Vincini, Maurizio. Journal of Electronic Commerce Research 5.2 (2004): 114-127.*

* cited by examiner

*Primary Examiner* — Michael Misiaszek
(74) *Attorney, Agent, or Firm* — Steven M. Greenberg, Esq.; CRGO Law

(57) ABSTRACT

Embodiments of the present invention address deficiencies of the art in respect to catalog modeling for e-commerce systems and provide a method, system and computer program product for an adaptive unified retail catalog. In an embodiment of the invention, an e-commerce data processing system can be configured for catalog adaptation. The system can include an adaptive retail catalog, a logical catalog implementation of a logical catalog model coupled to the adaptive retail catalog, and a physical catalog coupled to the adaptive retail catalog through a database mediator. The system further includes a mapping of search requests against the logical catalog implementation to the physical catalog. In this way, changes to the underlying physical catalog model can be accommodated without requiring a companion change in the logical catalog model.

13 Claims, 5 Drawing Sheets

SYSTEM, METHOD, AND COMPUTER PROGRAM PRODUCT FOR CATALOG ADAPTATION

BACKGROUND OF THE INVENTION

1. Field of the Invention

The present invention relates to the field of e-commerce and more particularly to catalog management in an e-commerce system.

2. Description of the Related Art

E-commerce systems have evolved to provide virtual storefronts whose operational capabilities far exceed those of the traditional, brick and mortar store. Whereas in the brick and mortar store, each of the sales, marketing, order fulfillment, inventory, and customer service functions remain the separate responsibilities of corresponding business roles, in a well-defined e-commerce system, each of the sales, marketing, order fulfillment, inventory and customer service can be integrated in a single computing system in a highly automated fashion. Consequently, a more optimal business operation can result in which data flows between different functional subsystems seamlessly to facilitate the daily conduct of business managed by the e-commerce system.

In the prototypical e-commerce system, an on-line catalog of available goods and/or services for sale can be established along with associated pricing. Customers can be provided with a store front user interface through which customers can browse the on-line catalog. When a customer desires to purchase a product or service, the customer can so indicate causing the addition of the selected product or service to an on-line shopping cart, though it is also known to bypass the shopping cart model in favor of direct purchase model.

Many retail catalog designs have evolved over time to accommodate many different retail settings. The adaptation of a given retail catalog design generally includes a physical catalog configuration in a database consistent with the specific nature of the intended retail environment. The adaptation the a given retail catalog design further generally includes a specific logical interface to the physical catalog providing underlying program code consistent with the physical catalog and supporting a user interface appropriate for the intended retail environment. Adapting a given retail catalog design from one retail environment to another, then, can be an error-prone and consuming process—particularly where the requirements of the retail environments different from one another in significant ways.

The close coupling of the logical catalog design and the physical catalog design no doubt complicates the adaptation of a retail catalog subsystem from one retail environment to another. Furthermore, the close coupling of the logical catalog design can have further undesirable consequences. In particular, even if it is not desired to adapt the retail catalog from one retail environment to another, a seemingly insignificant change to the physical catalog design can have a sweeping effect on the logical catalog design, requiring code changes to the logical catalog design. Conversely, a change to the logical catalog design can result in a required change to the underlying physical catalog—an equally undesirable consequence. Of course, the close coupling of the physical catalog to the logical catalog design cannot support adaptive and flexible technologies including the service oriented architecture (SOA) driven applications.

BRIEF SUMMARY OF THE INVENTION

Embodiments of the present invention address deficiencies of the art in respect to catalog modeling for e-commerce systems and provide a novel and non-obvious method, system and computer program product for an adaptive unified retail catalog. In an embodiment of the invention, an e-commerce data processing system can be configured for catalog adaptation. The system can include an adaptive retail catalog, a logical catalog implementation of a logical catalog model coupled to the adaptive retail catalog, and a physical catalog coupled to the adaptive retail catalog through a database mediator. Importantly, the system can include a mapping of search requests against the logical catalog implementation to the physical catalog. In this way, changes to the underlying physical catalog model can be accommodated without requiring a companion change in the logical catalog model.

In one aspect of the embodiment, the logical catalog implementation can include a catalog instance associated with at least one instance of a catalog entry for a catalog offering such as a product or a service, or at least one instance of a catalog group for a grouping of catalog offerings. In this regard, the catalog entry and the catalog group each can include an association with at least one attribute such as a product or service feature or characteristic. The catalog entry and the catalog group each further can include an association with at least one of a related catalog entry and a related catalog group. In another aspect of the embodiment, the logical catalog can include an extensible markup language (XML) schema definition (XSD) document describing the logical catalog model. In consequence, the search requests can include XML path (XPATH) expressions that conform to the XSD document. The physical catalog in turn can include multiple data sources and the logical catalog comprises a single view to the plurality of data sources.

Another embodiment of the invention can include a catalog adaptation method for e-commerce systems. The method can include configuring a physical catalog with multiple different catalog entries. The method further can include instantiating a logical catalog instance of a logical catalog model corresponding to the physical catalog. Notably, the method can include generating a mapping of search requests against the logical catalog instance to database queries against the physical catalog. Consequently, the physical catalog can be modified to accommodate a catalog change and the mapping can be further modified to reference the catalog change in the physical catalog.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for an adaptive unified retail catalog. In accordance with an embodiment of the present invention, a physical model of a retail catalog can be established separately from a logical model for the retail catalog. The logical model can be mapped to the physical model such that queries against the logical model can be mapped to queries against the physical model, which can include a single physical data source, or multiple physical data sources. Likewise, results produced by queries against the physical model can be transformed into results compatible with the logical model. In consequence of the de-coupling of the logical model from the physical model, changes in the underlying physical model then require a corresponding change in the mapping between the logical model and the physical model and not in the logical model, itself.

Figure 1:
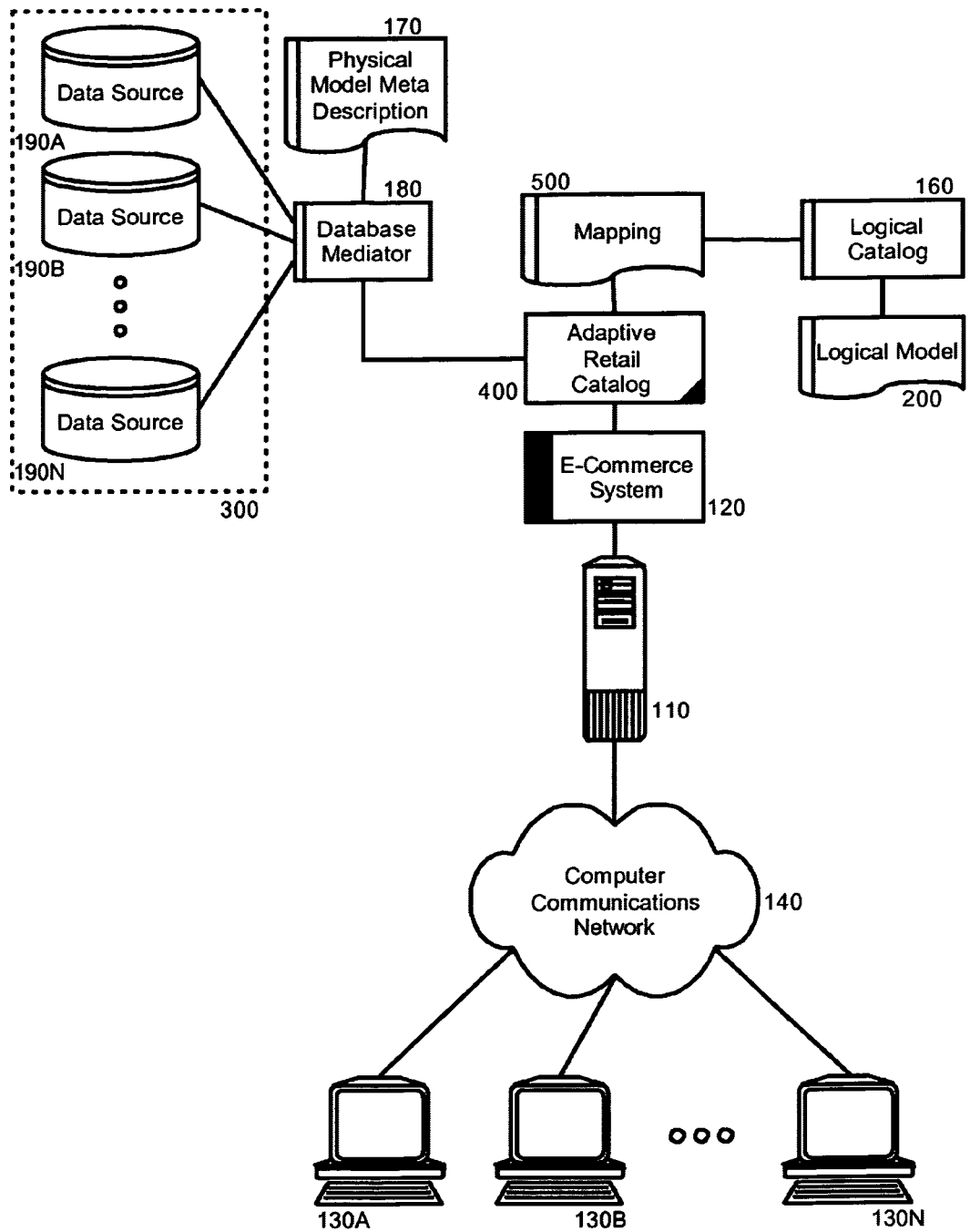
FIG. 1 is a schematic illustration of an e-commerce data processing system configured for use with an adaptive retail catalog.

In illustration, FIG. 1 is a schematic illustration of an e-commerce data processing system configured for use with an adaptive retail catalog. The system can include a host computing platform 110 configured for communicative coupling to one or more client computing devices 130A, 130B, 130N over a computer communications network 140. The host computing platform 110 can be configured to host the operation of an e-commerce system 120. The e-commerce system 120 can be enabled for retail transactions. To that end, the e-commerce system 120 can be configured for use with an adaptive retail catalog 400.

The adaptive retail catalog 400 can include separate physical and logic catalog models 200, 300. Specifically, the adaptive retail catalog 400 can include a logic catalog 160 implementing a logical catalog model 300. The adaptive retail catalog 400 further can include a physical catalog 200 disposed in one or more data sources 190A, 190B, 190N. The structure of the physical catalog model 300 can be described in a physical model meta-description 170. Additionally, access to the data sources 190A, 190B, 190N of the physical catalog 300 can be facilitated by a database mediator 180 such as a database connectivity framework. Notably, a mapping 500 can be provided mapping the structure of the logical catalog 160 implementing the logical catalog model 200 to the structure of the physical catalog model 300.

In operation, access to the adaptive retail catalog 400 can be provided by directed queries to the logical catalog 160. The queries to the logical catalog 160 can be mapped to equivalent queries in the physical catalog 300 according to the mapping 500. Results provided by the query to the physical catalog 300 can be mapped to a result consistent with the logical catalog 160 and returned to the requestor. As the logical catalog 160 can remain separate from the physical catalog 300, changes to the physical catalog 300 can be accommodated without changes to the logical catalog 160. Rather, changes to the mapping 500 to compliment the changes to the physical catalog 300 can suffice.

Figure 2:
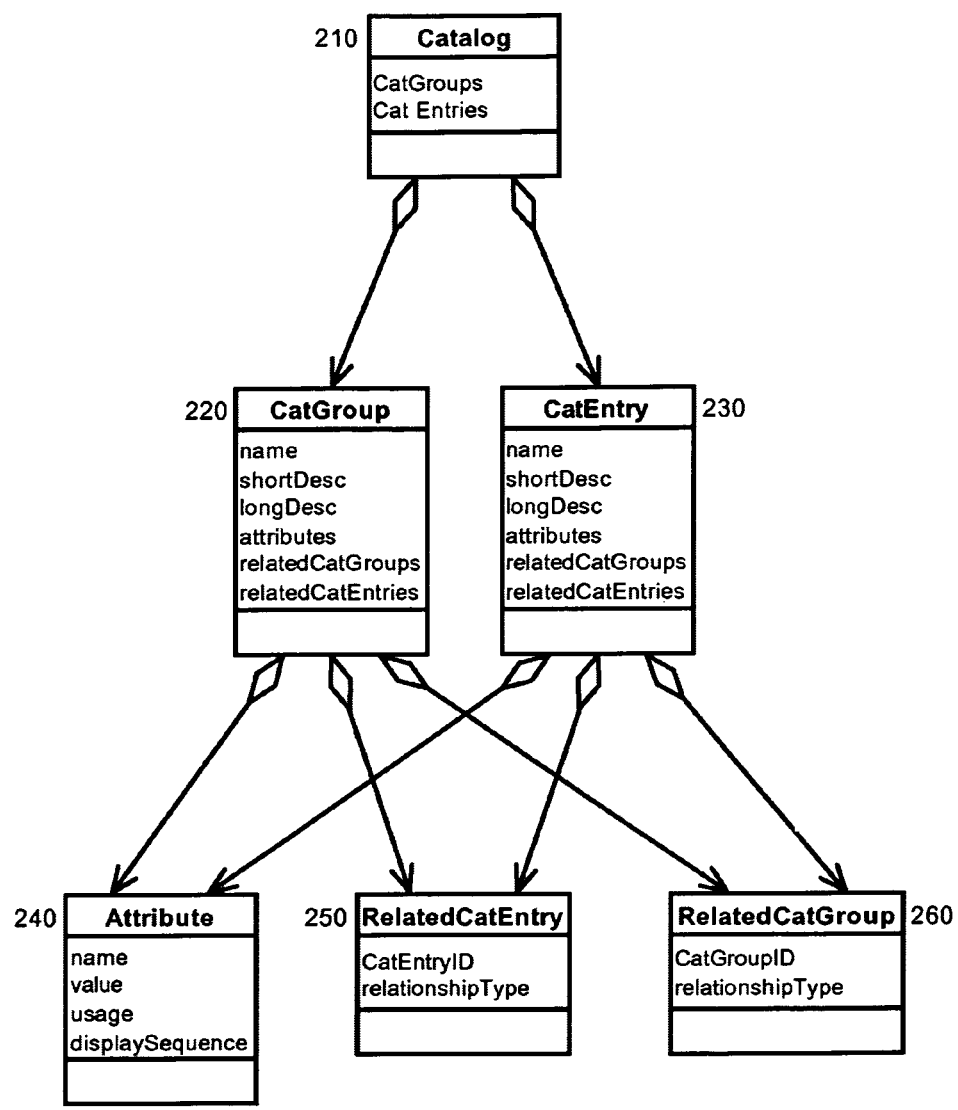
FIG. 2 is a class diagram illustrating a logical catalog model configured for use in the data processing system of FIG. 1.

In further illustration, FIG. 2 is a class diagram illustrating a logical catalog model configured for use in the data processing system of FIG. 1. The logical catalog model can include an instance of a catalog 210. The instance of the catalog 210 can include an association with one or more instances of a catalog group 220 and one or more instances of a catalog entry 230. Each instance of the catalog group 220 can represent a grouping of related catalog entries and can include a reference to one or instances of an attribute 240, along with zero or more instances of a related catalog entry 250 and a related catalog group 260. Similarly, each instance of the catalog entry 230 can represent a catalog entry such as a product, item or bundle and can include a reference to one or more instances of an attribute 240, along with zero or more instances of a related catalog entry 250 and a related catalog group 260. Related catalog entries can include related entries for the purpose of up-selling, cross-selling product-to-item, bundle-to-item, and the like.

The architecture defined by the catalog 210 can describe a catalog generically and, in consequence, can cover broad requirements. For example, the category group 220 can include a category tree display group or merchandising association group. Likewise, a catalog entry 230 can represent a product, item, package, or bundle, to name only a few examples. Similarly, the attribute 240 can represent any of the properties of the category group 220 or the category entry 230. Importantly, the logical catalog model can be defined according to an XSD document. As the XSD document defines both the input and the output of the catalog 210, a client can access the retail catalog 210 through an XPATH request in order to receive in return a result disposed in a service data object (SDO) formatted object generated from the XSD document.

Figure 3:
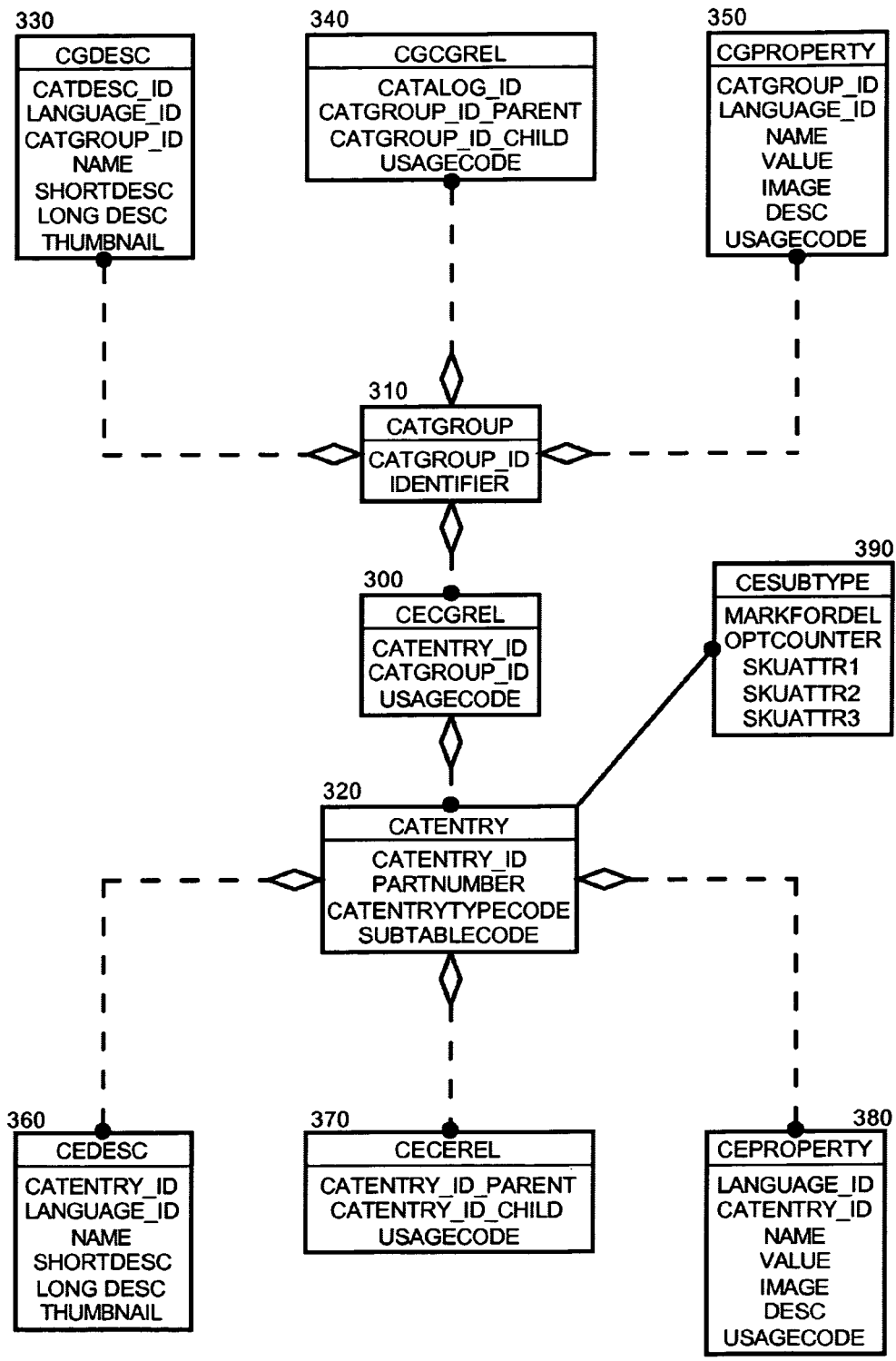
FIG. 3 is an entity diagram illustrating a physical catalog model configured for use in the data processing system of FIG. 1.

The physical model of the adaptive retail catalog of FIG. 1 can be implemented among multiple data stores, including one or more relational databases. As in the case of the logical catalog model, the physical data model can include two subject areas: a catalog group for a grouping of catalog offerings, and a catalog entry for a catalog offering, such as a product or service. In more particular illustration, FIG. 3 is an entity diagram illustrating a physical catalog model configured for use in the data processing system of FIG. 1. Referring to FIG. 3, each subject area can include an anchor entity. For the catalog group, the CATGROUP 310 anchor entity can be provided. Similarly, for the catalog entry, the CATENTRY 320 anchor entity can be provided.

The CATGROUP 310 anchor entity can include associate entities, including a description entity 330, a relationship entity 340 and an attribute entity 350. Likewise, the CATENTRY 320 anchor entity can include associate entities, including a description entity 360, a relationship entity 370 and an attribute entity 380. Notably, a sub-table entity 390 further can be associated with the CATENTRY 320 in order to support product/service classification according to different product/service attributes or characteristics to improve the query performance. Finally, the CATGROUP 310 can be related to the CATENTRY 320 through the category group/category entity relationship entity 300.

Figure 4:
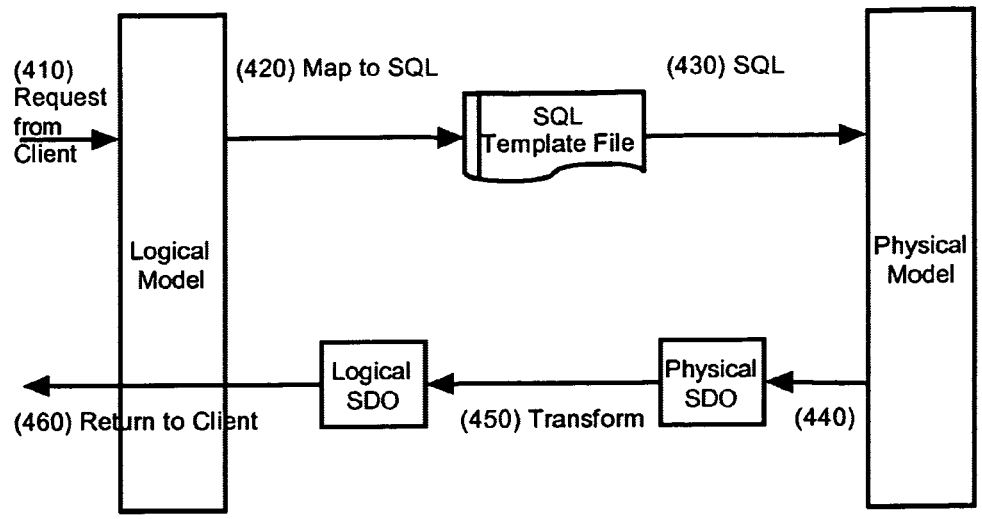
FIG. 4 is a block diagram illustrating a method for processing catalog requests in the adaptive retail catalog of FIG. 1.

In operation, requests to the logical catalog can be mapped to queries to the physical model in order to produce a result set. The result set, in turn, can be transformed into a result object and provided to the requesting client. In yet further illustration, FIG. 4 is a block diagram illustrating a method for processing catalog requests in the adaptive retail catalog of FIG. 1. As shown in FIG. 4, in step 410, a request can be received from a requesting client in the logical model. For instance, the request can be an XPATH expression governed by an XSD document for the logical model. Thereafter, in path 420 the request can be mapped to a suitable query for the physical model, for example a structured query language (SQL) request. Subsequently, in path 430 the query can be applied against the physical model.

In path 440, a result can be produced from the physical model and in path 450, the physical result can be transformed into a suitable logical representation specified by the XSD document for the logical model, for example the result can be transformed into an SDO object. Finally, in path 460 the transformed result can be provided to the client. The skilled artisan will recognize the separation of the logical model from the physical model such that modifications to the physical model can be performed without requiring companion modifications to the logical model. To support the separation and independence of the physical model and logical model, however, requires the mapping of search requests across the logical model to database queries against the physical model.

Figure 5:
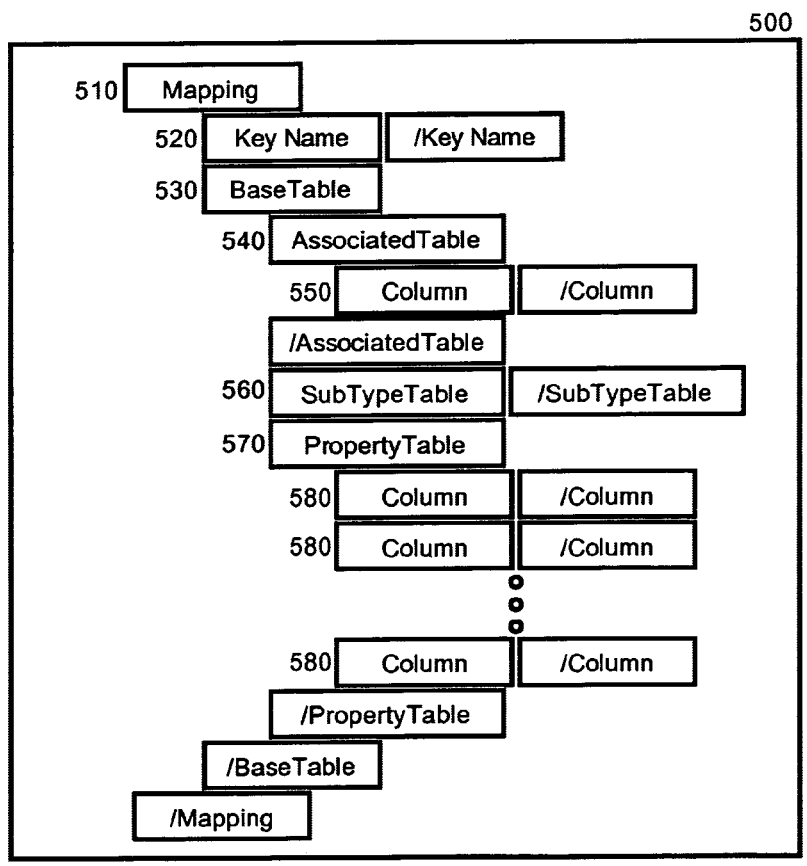
FIG. 5 is a block diagram illustrating a mapping of logical model requests to physical model requests; and, FIG. 6 is a flow chart illustrating a process for adapting the retail catalog to a different retail environment.

In illustration, FIG. 5 is a block diagram illustrating a mapping of logical model requests to physical model requests. As shown in FIG. 5, a mapping 500 can specify the mapping of search requests across the logical model to database queries against the physical model. The mapping 500 can include a mapping tag 510 enveloping a key name 520 for the mapping 500, and an entry for a base table 530. The base table 530 can specify an associated table 540 having one or more specified columns 550. The base table 530 further can include a sub-type table (not shown) where necessary to extend the associated table 540 to accommodate, for example, product classifications by multiple, different attributes. Finally, a property table 570 having one or more columns 580 can be associated with the base table 530. Locating a mapping for a particular search request for the logic model can involve matching the request by key to the mapping.

Figure 6:
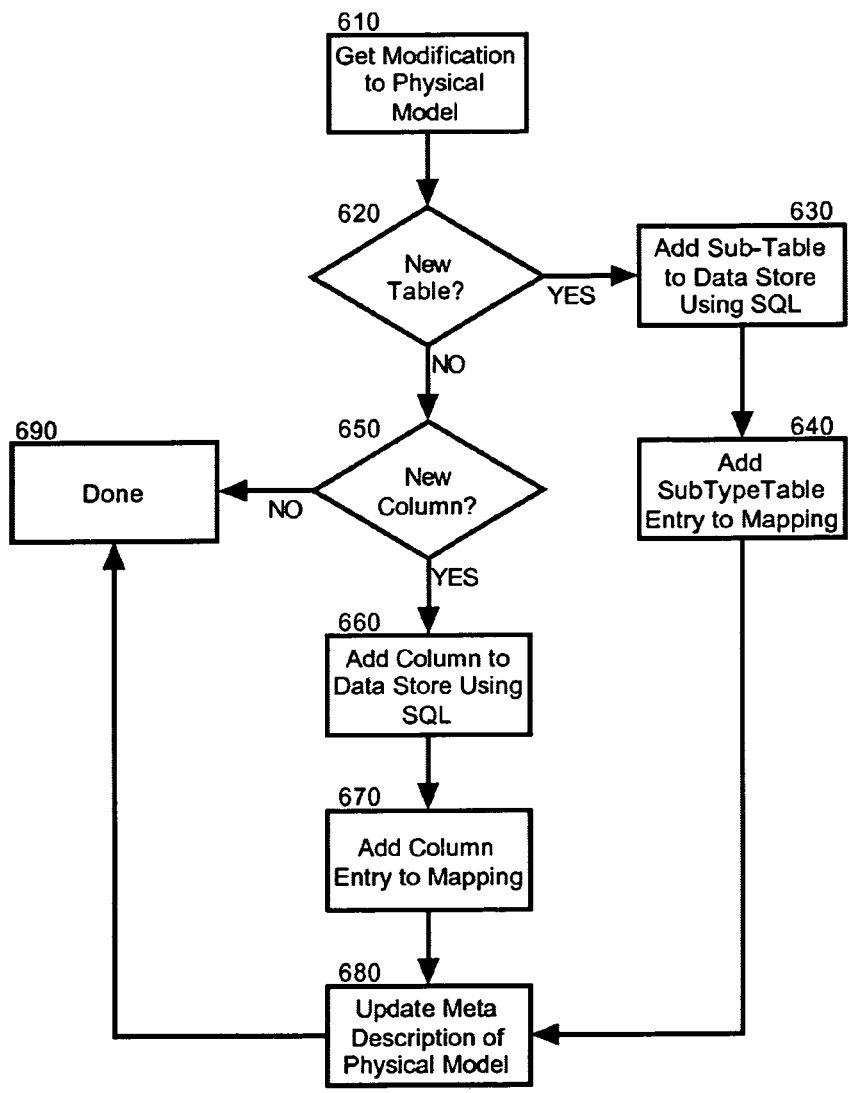

The effective separation of the logical model from the physical model can permit ad hoc modification of the physical model and the mapping in order to adapt the catalog from one retail environment to the next without also requiring a modification of the logical catalog model. To that end, FIG. 6 is a flow chart illustrating a process for adapting the retail catalog to a different retail environment. Beginning in block 610, a modification to the physical model can be determined. The modification can include an extension to the physical model to accommodate a new product, item or bundle, for instance, or merely a variation of an existing product, item or bundle.

In decision block 620, if the modification requires the addition of a new table to the physical model, in block 630 a new sub-table can be added by way of a SQL statement and a corresponding entry can be added to the mapping in block 640. By comparison, if in decision block 650 the modification involves the addition of a new column to an existing table, in block 660 the column can be added by way of a SQL statement and in block 670 a new column entry can be added to the mapping. Thereafter, in block 680 the meta-description of the physical model can be updated accordingly. Finally, in block 690 the process can end.

Notably, the decoupled logical model of the adaptive retail catalog of FIG. 1 can accommodate product classification according to a wide range of attributes without causing performance degradation normally associated with product classification in a conventional catalog subsystem. Specifically, a number of sub-tables can be established for a catalog entry for respective attributes. The mapping can maintain the relationship between each of the sub-tables for the attributes. In this way, adding new attributes to the catalog can involve a modification to the physical model without requiring a modification to the logical model for the adaptive retail catalog.

One skilled in the art may appreciate that embodiments incorporating catalogs for purposes other than retail, such as, but not limited to, business to business (B2B), may also be included in addition to the described preferred embodiment. Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An e-commerce data processing system configured for catalog adaptation, the system comprising:
   a processor, memory and fixed storage;
   an e-commerce system executing in the memory by the processor and handling retail transactions from different customers from over a computer communications network;

an adaptive retail catalog disposed in the fixed storage and configured for use with the e-commerce system, the adaptive retail catalog comprising both a logical catalog model and a physical catalog model;

a logical catalog implementation of the logical catalog model coupled to the adaptive retail catalog disposed in the fixed storage;

a physical catalog implementation of the physical catalog model and providing a configuration in a database consistent with a specific nature of an intended retail environment, the physical catalog configuration being coupled to the adaptive retail catalog through a database mediator disposed in the fixed storage and comprising a database connectivity framework;

a mapping of search requests against the logical catalog implementation to the physical catalog disposed in the memory; and, computer program code executing in the memory of the e-commerce data processing system by the processor of the e-commerce data processing system and enabled to configure the physical catalog model with a plurality of catalog entries for respective catalog offerings, to instantiate the logical catalog implementation, to generate the mapping, to modify the physical catalog model to accommodate a catalog change by adding a reference in a catalog entry in the physical catalog model to a sub-table in the physical catalog model for an attribute of a catalog offering and mapping the sub-table to the logical model to extend the physical catalog model to address product classification and to further modify the mapping to reference the catalog change in the physical catalog model.

2. The system of claim 1, wherein the logical catalog implementation comprises a catalog instance associated with at least one instance of at least one of a catalog entry for a catalog offering and a catalog group for a group of catalog offerings, the catalog entry and the catalog group each comprising an association with at least one attribute.

3. The system of claim 2, wherein the catalog entry and the catalog group each comprises an association with at least one of a related catalog entry and a related catalog group.

4. The system of claim 2, wherein the catalog entry comprises an association with a sub-table for an attribute of the catalog offering.

5. The system of claim 1, wherein the logical catalog comprises an extensible markup language (XML) schema definition (XSD) document describing the logical catalog model.

6. The system of claim 5, wherein the search requests comprises XML path (XPATH) expressions.

7. The system of claim 2, wherein the physical catalog comprises a plurality of data sources and the logical catalog comprises at least one view to the plurality of data sources.

8. A catalog adaptation method for e-commerce systems, the method comprising:

configuring in fixed storage of a computer a physical catalog implementation of a physical catalog model with a plurality of catalog entries for respective catalog offerings, the physical catalog implementation of a physical catalog model being a configuration in a database consistent with a specific nature of an intended retail environment;

instantiating in memory of the computer a logical catalog instance of a logical catalog model corresponding to the physical catalog model;

generating by a processor of the computer a mapping of search requests against the logical catalog instance to database queries against the physical catalog disposed in the memory;

modifying by the processor of the computer the physical catalog model to accommodate a catalog change by adding a reference in a catalog entry in the physical catalog to a sub-table in the physical catalog model for an attribute of a catalog offering and mapping the sub-table to the logical model to extend the physical catalog model to address product classification; and, further modifying by the processor of the computer the mapping to reference the catalog change in the physical catalog model.

9. The method of claim 8, further comprising:

generating an extensible markup language (XML) schema definition (XSD) document describing the logical catalog model; and, processing XML path (XPATH) search requests conforming to the XSD document.

10. The method of claim 9, wherein mapping of search requests against the logical catalog instance to database queries against the physical catalog, comprises mapping the XPATH search requests to structured query language (SQL) queries against the physical catalog.

11. A computer program product comprising a non-transitory computer usable storage medium embodying computer usable program code for catalog adaptation for e-commerce systems, the computer program product comprising computer usable program code that, when executed, causes a processor to perform:

configuring in fixed storage of a computer a physical catalog implementation of a physical catalog model with a plurality of catalog entries for respective catalog offerings, the physical catalog implementation of a physical catalog model being a configuration in a database consistent with a specific nature of an intended retail environment;

instantiating in memory of the computer a logical catalog instance of a logical catalog model corresponding to the physical catalog model;

generating by a processor of the computer a mapping of search requests against the logical catalog instance to database queries against the physical catalog disposed in the memory;

modifying by the processor of the computer the physical catalog model to accommodate a catalog change by adding a reference in a catalog entry in the physical catalog model to a sub-table in the physical catalog model for an attribute of a catalog offering and mapping the sub-table to the logical model to extend the physical catalog model to address product classification; and, further modifying by the processor of the computer the mapping to reference the catalog change in the physical catalog model.

12. The computer program product of claim 11, further comprising:

computer usable program code for generating an extensible markup language (XML) schema definition (XSD) document describing the logical catalog model; and, computer usable program code for processing XML path (XPATH) search requests conforming to the XSD document.

13. The computer program product of claim 12, wherein the computer usable program code for mapping of search requests against the logical catalog instance to database queries against the physical catalog, comprises computer usable program code for mapping the XPATH search requests to structured query language (SQL) queries against the physical catalog.

* * * * *